Patented May 1, 1928.

1,668,502

UNITED STATES PATENT OFFICE.

MARY E. HALL, OF CHICAGO, ILLINOIS.

FACIAL BLEACH PACK.

No Drawing.   Application filed September 20, 1926.   Serial No. 136,738.

This invention relates to a facial bleach pack. Many substances and mixtures have been used for this purpose some of which have almost no beneficial action while others are injurious to the skin.

My bleach pack composed almost entirely of substances of animal origin has no injurious effect whatever and cleanses the skin by subjecting it to an astringent action which causes the pores to contract thereby squeezing accumulations of heavy oils, effete matter and the like from them.

This bleach pack is made by mixing nine parts of dehydrated whole milk, three parts of dried white of egg and one part of vanillin which is the dried extract of vanilla beans.

This powdered mixture is used by mixing one teaspoonful with two teaspoonfuls of milk, cream or water and applying as a paste to the face and neck and allowed to remain for twenty to thirty minutes, after which it is washed off with warm water and a good facial cleansing cream and powder applied. The results will also be better if a cleansing cream is used before the bleach pack.

The astringent action is due principally to the powdered white of egg and its action is rendered slower and less active by the presence of the dehydrated milk.

While I have described but a single embodiment of this invention, it is to be understood that it is capable of many modifications. Changes therefore in the constituents may be made which do not depart from the spirit and scope of the invention as disclosed in the appended claims.

I claim:

1. A facial bleach pack comprising a mixture of dehydrated whole milk, and dried white of egg.

2. A facial bleach pack comprising a mixture of dehydrated whole milk, dried white of egg, and vanillin.

3. A facial bleach pack comprising a mixture of nine parts of dehydrated whole milk, three parts of dried white of egg, and one part of vanillin.

In testimony whereof I have hereunto set my hand this 3rd day of September, 1926.

MARY E. HALL.